United States Patent [19]

Scholten et al.

[11] 4,081,516
[45] Mar. 28, 1978

[54] SEPARATION OF CATALYST PARTICLES FROM A SUSPENSION OF THESE PARTICLES IN AN AQUEOUS HYDROXYL-AMMONIUM SALT SOLUTION

[75] Inventors: Joseph J. F. Scholten, Sittard; Hendrik L. T. Koks, Geulle, both of Netherlands

[73] Assignee: Stamicarbon, B.V., Geleen, Netherlands

[21] Appl. No.: 614,663

[22] Filed: Sep. 18, 1975

[30] Foreign Application Priority Data

Sep. 19, 1974 Netherlands ............... 7412381

[51] Int. Cl.$^2$ ............................................. C01B 21/14
[52] U.S. Cl. .................................... 423/387; 210/54; 252/410

[58] Field of Search ................. 423/387, 388; 252/411 R, 412, 413, 410; 210/54 A; 209/5; 23/313

[56] References Cited

U.S. PATENT DOCUMENTS

| | | | |
|---|---|---|---|
| 2,414,142 | 1/1947 | Dreyfus et al. | 423/387 |
| 2,628,889 | 2/1953 | Benson | 423/387 |
| 2,903,438 | 9/1959 | Stautzenberger et al. | 210/54 A |
| 3,165,465 | 1/1965 | Ray et al. | 209/5 |
| 3,346,463 | 10/1967 | Goren | 209/5 X |
| 3,640,897 | 2/1972 | Restaino | 252/412 |

*Primary Examiner*—Earl C. Thomas
*Attorney, Agent, or Firm*—Cushman, Darby & Cushman

[57] ABSTRACT

A process for forming hydroxylamine and/or its salt, by reducing nitrogen monoxide, nitric acid, or a nitrate salt and improvements therein, wherein starch, gelatin, polyacrylamide or polyvinyl alcohol is added to the reaction mixture.

7 Claims, No Drawings

SEPARATION OF CATALYST PARTICLES FROM A SUSPENSION OF THESE PARTICLES IN AN AQUEOUS HYDROXYL-AMMONIUM SALT SOLUTION

BACKGROUND OF THE INVENTION

Hydroxylamine and hydroxyl-ammonium salts are used in connection with the manufacture of caprolactam. Cyclohexanone and the hydroxylamine or its salt, are reacted to form cyclohexanone oxime; the cyclohexanone oxime is further reacted to form the caprolactam.

Hydroxylamine, and salts thereof, can be prepared by reducing nitrogen monoxide, nitric acid, or a nitrate by reducing the aforementioned compounds. A well known prior art method for reducing nitrogen monoxide, nitric acid or a nitrate to the hydroxylammonium salt of hydroxylamine is by treating those compounds with hydrogen and a hydrogenation catalyst, e.g., palladium, platinum or mixtures thereof on a support, in an acidic medium. U.S. Pat. No. 3,767,758 and British Patent Specification No. 772,693 disclose such processes, both of said references being incorporated herein by reference.

In such a catalytic hydrogenation of nitrogen oxide compounds, the reaction mixture must be treated to remove catalyst particles therefrom. Normally, the method of separation is by filtration. The reaction medium resulting from the reduction of those nitrogen oxide compounds is in the form of a suspension-solution. It has been discovered that filtration of the suspension-solution reaction mixture is difficult, since filtration resistance increases with time during the filtration of that reaction medium. The filtration resistance values, measured as drainage time through the filter, may rise to very high values. This filtration resistance is detrimental to procedures of preparation of the hydroxyl-ammonium salt, and to its isolation. The rise of filtration resistance appears to be caused by the presence of small amounts of impurities with a peptizing action; such impurities include, for example, succinic acid, hydroxylcarboxylic acids, amines, and toluene. These organic impurities can be present in the reaction mixture when the hydroxylammonium salt-containing reaction mixture is further reacted with a ketone to form an oxime and, after removal of the oxime from the reaction mixture, the remaining impure reaction medium is re-used in the preparation of a further amount of hydroxylammonium salt.

SUMMARY OF THE INVENTION

The invention is directed to a process for separating catalyst particles from a suspension of these particles in an aqueous solution containing hydroxyl-ammonium salt by well-known separating methods and the improvement thereon. The process is of practical importance in the preparation of hydroxylammonium salt solution which is employed in the manufacture of caprolactam, the starting material for nylon 6.

It has been descovered that the high filtration resistance, which is incurred on filtering the reaction mixture, produced by the reduction of nitrogen monoxide, nitric acid, or a nitrate by catalytic hydrogenation, may be lowered considerably by adding a polymeric material to the suspension. The catalytic reduction may be continued, even after addition of the polymeric material to the reaction, without detrimental effect on the activity and selectivity of the catalyst.

The process allows for the isolation of solutions containing hydroxyl-ammonium salts, substantially free of catalyst component contaminants. The process allows reduction of losses in catalysts by virtue of inclusion of the catalyst in the product. The process increases the efficiency of the basic process of producing hydroxyl-ammonium salt by reducing the time requirements for isolation of product thereby saving time and expenditure. The improvement of the invention increases the speed and efficiency of separation of product from the reaction mixture. The improvement of the invention is applicable to batch processes, as well as continuous processes for the formation of hydroxyl-ammonium salts (hydroxylamine).

DETAILED DESCRIPTION OF THE INVENTION

The invention is directed to improvements in the process for the formation and isolation of hydroxyl-ammonium salts (hydroxylamine). In particular, the process is an improved process in the reduction and isolation of hydroxyl-ammonium salts produced by catalytic hydrogenation of oxidic nitrogen compounds such as nitrogen monoxide, nitric acid, or a nitrate salt.

In catalytic hydrogenations of those compounds, the reaction mixture takes the form of a suspension, in which the catalyst is suspended in an acidic aqueous solution containing the hydroxyl-ammonium salt. Catalysts which are used in these processes include platinum, palladium, or mixtures thereof, on a support, such as coal. These catalytic hydrogenations are undertaken in aqueous acidic mediums. The acid component may be any mineral acid which does not intefere with the reaction and is inert thereto.

The improvement of the invention is directed to the addition of a polymeric material into the reaction mixture. The polymeric material may be added to the mixture at any time during the reaction process, that is, before, during or after the reduction occurs. The polymeric substance acts as a flocculating agent. Addition of the polymer allows for the efficient isolation of the product from the reaction mixture by decreasing filtration resistance, i.e., increasing drainage rate of the reaction mixture through a filter apparatus.

The amount of polymeric material which may be added may vary, e.g., between 0.1 and 20 milligrams per gram of catalyst. An amount of 0.25 to 2 milligrams per gram of catalyst is particularly suitable. If necessary, the addition of those amounts of polymeric material may be made repeatedly and periodically, for instance, after periods of 1 to 8 hours, without detrimental effect to the course of reaction. In order to insure optimal mixing of the polymeric material with the suspension, the polymeric material is preferably added as a diluted aqueous solution, e.g., of a concentration of 0.01 to 1% by weight. The solvent used for this purpose may be part of the reaction liquid.

The polymeric material may be either an anionic or a non-ionic polymer. Examples of suitable polymeric materials include starch, gelatin, polyacrylamide, and polyvinyl alcohol.

Very good results can be obtained by using a non-ionic polyacrylamide, such as, e.g., a polyacrylamide with an average molecular weight of $3 \times 10^7$ and an average degree of polymerization of $4 \times 10^5$ that is commercially available by the name of Meyprofloc P3.

Non-ionic polyacrylamide flocculating agents with different average molecular weights and different average degrees of polymerization can also be used. Although the catalyst particles appear to have a positive charge and, hence, an anionic flocculating agent would appear to be particularly suitable, a non-ionic polyacrylamide is found to give the best results.

The process according to the invention will be further elucidated in the following examples. These embodiments of the invention are not to be considered as limiting but are meant as exemplifications to be construed as encompassing alternative equivalents of the art.

EXAMPLE I

Nitrate was continuously reduced catalytically to hydroxylamine at a temperature of about 60° C. and a hydrogen pressure of 10 atmospheres in a reactor with an effective content of 3 liters, provided with a stirrer and 4 filter candles of sintered steel.

An aqueous solution fed to the reactor (5 kilograms per hour) contained 21.6 grams of phosphoric acid and 22.4 grams of ammonium nitrate per 100 grams.

The catalyst used was 15 grams of palladiumplatinum on porous active coal (8% by weight of palladium and 2% by weight of platinum). The stirrer speed was 2000 revolutions per minute.

The reaction liquid discharged through the filter candles contained 4.9 grams of phosphoric acid, 9.3 grams of monohydroxyl-ammonium phosphate, 11.7 grams of mono-ammonium phosphate, and 14.4 grams of ammonium nitrate per 100 grams. The capacity of the filter candles was such that, at the highest filtration resistance, the feed could still just be processed.

After 10-minute periods the amount of catalyst collected on the filter was returned into the reaction liquid by means of a short pressure pulse. Immediately after the filter candles were rinsed, the filtration resistance was determined by measuring the time required to obtain 0.3 liter of filtered reaction liquid (draining time).

The initial filtration resistance corresponded to a draining time of 40 seconds. Owing to the contamination of the solution fed in (the total amount of organic impurities, calculated as carbon, was 0.04 gram per 100 grams of liquid fed), the resistance rose, and the draining time amounted to about 100 seconds after about 9 hours. By switching over to a non-contaminated nitrate solution, the resistance fell to a draining time of 70 seconds after a total period of 18 hours. 15 milligrams of a polymer material was now added to the suspension in the reactor as a 0.05% by weight aqueous solution. The polymer material used was the polyacrylamide commercially available by the name of MEYPROFLOC P3 (non-ionic polyacrylamide with an average molecular weight of $3 \times 10^7$ and an average degree of polymerization of $4 \times 10^5$). In a period of about 5 minutes, the filtration resistance fell to the original draining time of 40 seconds, while this low filtration resistance was maintained without further addition of flocculating agent for 17 hours, after which the experiment was terminated.

EXAMPLE II

Nitrate was continuously reduced to hydroxylamine in the same way as in Example I. The nitrate solution had the same composition. 3.5 kg of solution were fed to the reactor per hour. At the start of the experiment, the filtration resistance corresponded to a draining time of 40 seconds. The reaction liquid was then contaminated by adding 0.75 gram of cyclohexyl amine per liter of nitrate solution to be reduced. The filtration resistance now rose to a draining time of 70 seconds in a period of 20 hours. Subsequently, 0.75 gram of cyclohexanone oxime per liter of solution to be reduced was added as an impurity, which caused the filtration resistance to rise further to a draining time of 100 seconds in a period of 12 hours. The addition of an impurity was now stopped, as a result of which the filtration resistance decreased to a constant draining time of 70 seconds in a period of 12 hours.

Addition of 4 milligrams of MEYPROFLOC P3 as a 0.05% by weight aqueous solution to the suspension in the reactor then reduced the filtration resistance to a draining time of 42 seconds in a period of 5 minutes.

What is claimed is:

1. In a process for the preparation and isolation of hydroxylamine comprising reducing an oxidic nitrogen compound selected from the group consisting of nitrogen monoxide, nitric acid and a nitrate salt by treating said oxidic nitrogen compound in an aqueous acid medium with hydrogen and a hydrogenation catalyst to form a suspension-solution containing hydroxylammonium salt and separating said hydroxyl-ammonium salt from said suspension-solution, the improvement comprising adding starch, gelatin, polyacrylamide or polyvinyl alcohol to said aqueous acid medium.

2. The process of claim 1, wherein the step of adding may be undertaken repeatedly and periodically.

3. The process of claim 1, wherein said hydroxylammonium salt is admixed with cyclohexanone and cyclohexanone oxime.

4. The process of claim 1, wherein the non-ionic polyacrylamide is added.

5. The process according to claim 1, wherein any of the four reagents which are added to the suspension-solution are added in an amount of 0.25 – 2 milligrams per gram of (c).

6. The process according to claim 1, wherein said hydrogenation catalyst is platinum, palladium, or mixtures thereof.

7. A process for the preparation and isolation of hydroxylamine consisting essentially of reducing an oxidic nitrogen compound selected from the group consisting of nitrogen monoxide, nitric acid and a nitrate salt, by treating said oxidic nitrogen compound in an aqueous acid medium with hydrogen and a hydrogenation catalyst to form a suspension-solution containing hydroxylammonium salt; adding starch, gelatin, polyacrylamide or polyvinyl alcohol to said aqueous acid medium; and separating said hydroxylammonium salt from said suspension-solution, said steps of reducing said oxidic nitrogen compound to form hydroxylamine and of separating said salt being continuous.

* * * * *